April 30, 1968     M. E. SHELL     3,380,404
CARGO HANDLING AND STORAGE APPARATUS
Filed Nov. 28, 1966     2 Sheets-Sheet 1
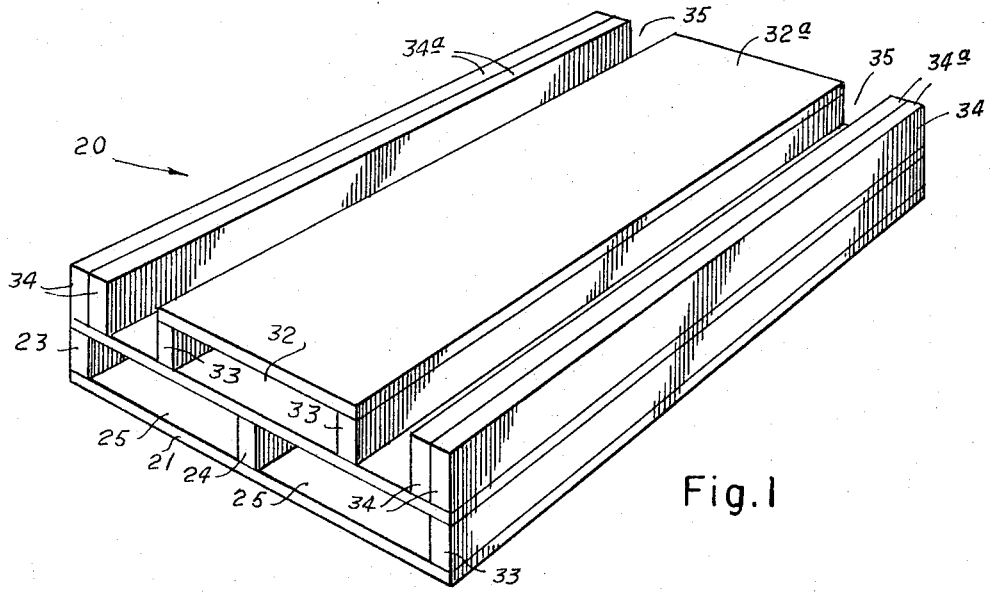
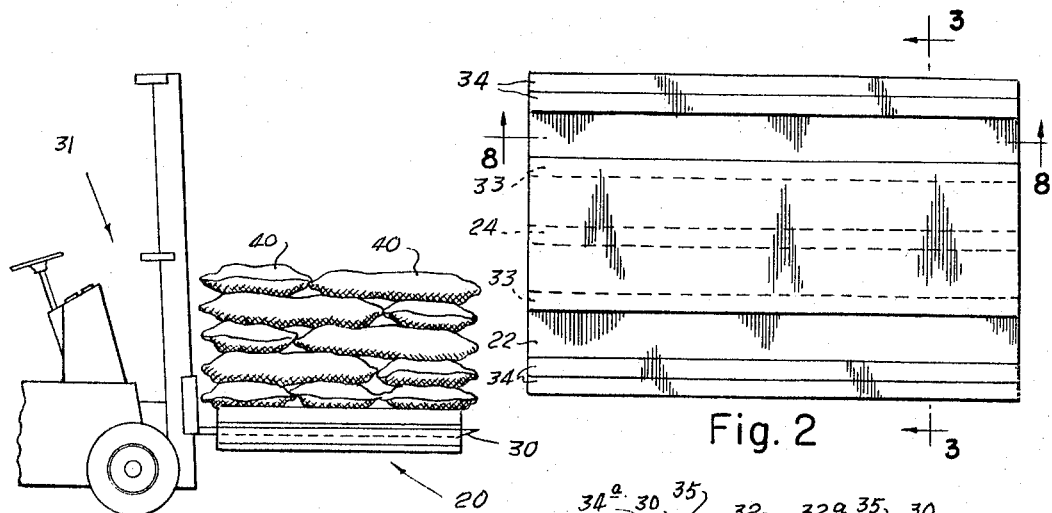
INVENTOR
Melvin E. Shell
BY
ATTORNEYS April 30, 1968   M. E. SHELL   3,380,404
CARGO HANDLING AND STORAGE APPARATUS
Filed Nov. 28, 1966   2 Sheets-Sheet 2

INVENTOR
Melvin E. Shell

BY Hastings Ackley
and
Walter J. Jay
ATTORNEYS

# United States Patent Office 3,380,404
Patented Apr. 30, 1968

3,380,404
CARGO HANDLING AND STORAGE APPARATUS
Melvin E. Shell, P.O. Box 698, Gorman, Tex. 76454
Filed Nov. 28, 1966, Ser. No. 597,308
7 Claims. (Cl. 108—52)

ABSTRACT OF THE DISCLOSURE

A cargo handling and storage support apparatus having supporting surfaces for supporting cargo thereon and provided with openings for fork lift trucks forks whereby the support apparatus may be used to lift the cargo supported thereon and having means providing access for the fork member of a fork truck lift beneath the cargo on the support means open to permit the fork member to lift the cargo from the support means. In one form the support apparatus is reversible to permit the cargo to be lifted by the fork member on the support apparatus by the fork lift truck and to permit the cargo to be lifted from the support apparatus by the fork lift truck regardless of the position of the support apparatus.

---

This invention relates to cargo handling and storage apparatus and more specifically relates to pallets for use with fork lift trucks.

It is one object of this invention to provide new and improved apparatus for cargo handling and storage.

It is another object of the invention to provide a new and improved cargo supporting pallet for use with a fork lift truck.

It is another object of this invention to provide a cargo pallet movable by a fork lift truck and on which the cargo is placed and from which the cargo is removed without physical contact with the pallet.

It is a further object of the invention to provide a cargo pallet having longitudinally extending slots for receiving the fork of a fork lift truck to releasably support the pallet on the fork and upwardly opening longitudinal recesses for receiving the fork during loading and unloading of cargo on the pallet.

It is still a further object of the invention to provide a cargo pallet having lower longitudinal open-ended fork receiving slots for use when supporting and moving the pallet with a fork lift truck and upper longitudinal upwardly opening recesses for receiving the fork when loading cargo on and removing cargo from the pallet.

Additional objects and advantages of the invention will be readily apparent from the reading of the following description of a device constructed in accordance with the invention, and reference to the accompanying drawings thereof, wherein:

FIGURE 1 is a perspective view of a cargo pallet embodying the invention;

FIGURE 2 is a top plan view of the pallet illustrated in FIGURE 1;

FIGURE 3 is a view in section along the line 3—3 of FIGURE 2;

FIGURE 4 is a side view in elevation showing the cargo pallet supported by a fork lift truck while loaded with a plurality of stacked, filled bags;

FIGURE 5 is a side view in elevation similar to FIGURE 4 showing the stack of bags only supported by the fork lift truck above an empty pallet;

Figure 6:
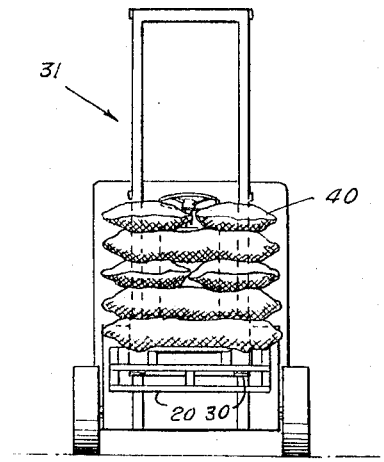
FIGURE 6 is a front view in elevation of the cargo pallet loaded with the filled bags as shown in FIGURE 4, supported on the truck.
Figure 7:
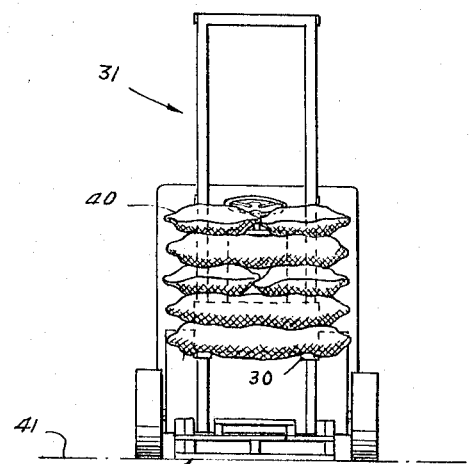
FIGURE 7 is a front view in elevation showing the stack of filled bags supported by the fork lift truck above an empty pallet.
Figure 8:
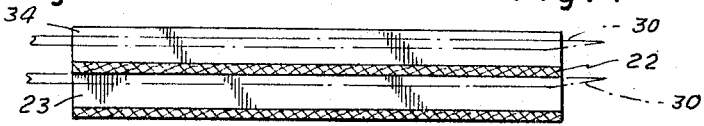
Figure 9:
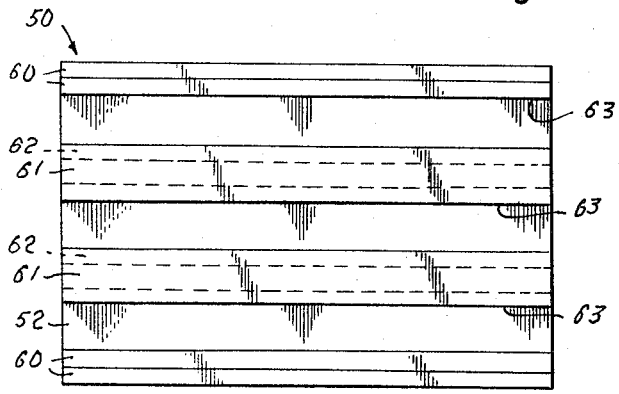
Figure 10:
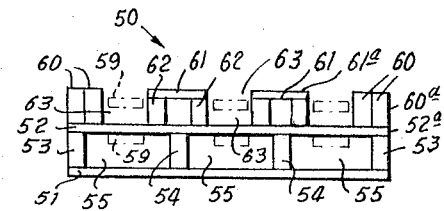
Figure 11:
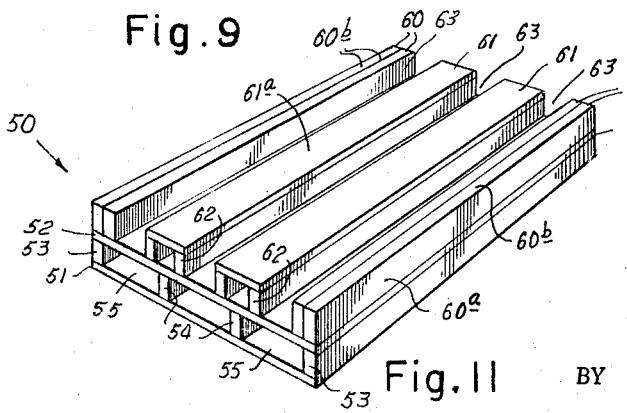
Figure 12:
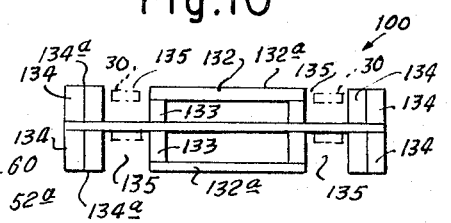

FIGURE 8 is a view in section and elevation along the line 8—8 of FIGURE 2 illustrating the lower position of the fork of the truck when supporting the pallet as in FIGURES 4 and 6 and the upper position of the fork preparatory to removal of the bags from the pallet when removing cargo to the position of FIGURES 5 and 7;

FIGURE 9 is a top plan view of an alternate form of cargo pallet embodying the invention;

FIGURE 10 is an end view in elevation of the cargo pallet of FIGURE 9 illustrating the lower position of the fork of a fork lift truck when supporting the pallet and the upper position of the fork when loading cargo on or removing cargo from the pallet;

FIGURE 11 is a view in perspective of the cargo pallet of FIGURES 9 and 10; and, FIGURE 12 is an end view in elevation similar to FIGURE 3 of a further form of cargo pallet embodying the invention.

Referring to FIGURES 1–3, a pallet 20 includes a bottom panel 21 and an intermediate panel 22 connected with each other in parallel spaced relationship by a pair of longitudinally extending side runners 23 and a middle runner 24 which extend in parallel spaced relationship between and in planes perpendicular to the panels 21 and 22.

The bottom and intermediate panels 21 and 22 together with the side and middle runners 23 and 24, respectively, define a pair of longitudinally extending open-ended slots 25 which are rectangular in cross section, FIGURE 3. The slots 25 receive fork members 30 on a fork lift truck 31, FIGURE 4, when the pallet is supported and maneuvered by the fork lift truck.

A top deck panel 32 is secured in parallel spaced relationship above the intermediate panel 22 by a pair of longitudinal, parallel, spaced members 33 which extend generally in directions parallel with runners 23 and 24 and having side surfaces perpendicular to the planes of the upper, intermediate, and top panels. Two sets of longitudinally extending adjacent side members 34 are secured to the intermediate panel 22 parallel to and spaced from the members 33. The side surfaces of the longitudinal members 34 lie in planes perpendicular to the top surface of the intermediate panel 22. The members 33 together with top surface portions of the intermediate panel 22 and the inside side wall surfaces of the adjacent side members 34 define a pair of spaced parallel longitudinally extending slots 35 which open upwardly and at opposite ends to receive the fork members 30 of the fork lift truck at an upper position relative to the pallet, FIGURES 3 and 8, for loading cargo on and removing it from the pallet. The top edge surfaces 34a of the side members 34 and the top surface 32a of the panel 32 lie in the same plane providing supporting surface portions for cargo stored on and handled by the pallet.

The pallet 20 is especially adapted to the support of cargo both during storage and while being moved and readily permits loading cargo on and unloading it from the pallet with the same fork lift truck employed in transporting the pallet either loaded or empty. Stacked, filled, bags 40 are supported on the top surface portions 32a and 34a of the pallet during both storage and moving of the bags. After the bags are stacked on the pallet in the relationship shown in FIGURES 4 and 6 the fork members 30 of the fork lift truck 31 are fully inserted into the slots 25. Preferably, if the relative sizes of the slots and fork members permit, a short end portion of the fork members project from the other ends of the slots, FIGURES 4 and 8. The fork members are raised vertically by the truck with the upper surfaces of the members engaging lower surface portions of the intermediate panel member 22 to lift the pallet with the sacks supported on its top surfaces 32a and 34a to a desired elevation for maneuvering by the truck, such as moving to a location for unloading or to a storage area at which the pallet may be lifted to rest upon another loaded pallet or placed on a supporting surface such as the floor of a building. The fork members 30 remain in the slots 25 in the relationship shown in FIGURES 3 and 8 throughout the process of moving the loaded pallet.

When the loaded pallet is moved to a location where the stack of bags 40 are to be removed from it, the pallet is lowered until it rests on a supporting surface such as the floor 41, FIGURES 5 and 7. The fork members 30 are fully withdrawn from the slots 25 and inserted into the slots 35 of the pallet beneath the bottom layer of the stacked bags, FIGURES 3 and 8. The position of the fork members after insertion into the slots 35 is represented by the upper position of the members as shown in FIGURES 3 and 8 in broken lines. Preferably, the fork members are inserted into the slots 35 spaced below the lower layer of bags sufficiently to avoid tearing the bags. Preferably, therefore, the fork members are inserted in the slots 35 spaced between the upper surfaces of the pallet and the top surface of the intermediate panel. When the fork members are fully inserted into the slots 35 they are raised by the lift truck to engage the lower layer of the stacked bags and elevate the bags above the pallet as illustrated in FIGURES 5 and 7. The upwardly opening slots 35 allow the fork members to move freely upwardly lifting the stacked bags while leaving the empty pallet resting on the floor surface 41.

Cargo, such as the bags 40, is loaded by hand or by mechanical means directly on the top supporting surfaces of the pallet, or, in the alternative, the bags are stacked on the fork members of the lift truck which then positions the stacked bags on the pallet. If space and location limitations prevent the placing of a pallet on a floor or platform surface adjacent to cargo to be loaded, such as when a truck bearing the cargo is parked adjacent to a loading platform at different elevations therefrom, the pallet may be supported from the fork members by positioning them as previously described in the slots 25 and the pallet lifted by the fork members to a desired elevation with the cargo then being loaded directly onto the lift truck supported pallet which then is moved to a desired location. On the other hand, if loading directly onto the pallet by fork lift truck is not desired or not practical, the cargo may be placed on the fork members 30 as desired for storage on the pallet. The fork lift truck is then maneuvered adjacent to a pallet on which the cargo is to be stored and the fork members are lowered into the slots 35 of the pallet until they are spaced below the lower surface of the cargo being loaded with the cargo being supported by the surfaces 32a and 34a of the pallet. The fork members are then withdrawn from the slots 35 leaving the cargo stacked on the pallet. If desired, the fork lift truck may then be employed to move the pallet by reinserting the members 30 into the slots 25 below the intermediate panel 22 as previously discussed.

An especially important application of the cargo pallet 20 is in the handling of sacks of loose materials, such as peanuts, beans and the like, for moving the sacks from storage on the pallets into boxcars, trucks, and other transport vehicles for shipment without the pallets. By stacking the sacks for shipment without cargo pallets an appreciably increased quantity may be shipped in a vehicle. Thus, the stacked sacks are lifted by the fork lift truck from the pallet on which they are stored and moved into the transporting vehicle where they are placed at a desired location on the vehicle floor or on a stack of previously positioned sacks. The fork members of the truck are withdrawn from beneath the sacks without affecting the sacks after they have been lowered to the floor or previously positioned sacks. Thus, by moving each load of stacked sacks into the transporting vehicle without its pallet several additional layers of sacks generally are stackable within the vehicle since space is not consumed by supporting cargo pallets.

Another form of pallet 50 embodying the invention is illustrated in FIGURES 9–11. The pallet 50 includes a bottom panel 51 and an intermediate panel 52 secured in parallel spaced relationship by side longitudinal parallel runners 53 and inner longitudinal parallel runners 54. The side surfaces of the side and inner runners perpendicular to the bottom and intermediate panels 51 and 52 and with such panels define longitudinal, parallel, open-ended slots 55, each of which receives one of the fork prongs 60 when a fork lift truck such as the truck 31 is equipped with a fork member having three spaced prongs as distinguished from the dual prong fork members illustrated in FIGURES 4–7.

Two sets of side members 60 are secured along side portions of the top surface of the intermediate panel 52 in parallel spaced relationship. The side surfaces of the members 60 are perpendicular to the top surface of the intermediate panel. The outer side surface 60a of each set of side members 60 is aligned with a side edge 52a of the intermediate panel 52. A pair of top panel members 61 are secured in a common plane in parallel spaced relationship relative to each other and parallel to and spaced above the intermediate panel 52. A pair of longitudinal members 62 positioned in parallel spaced relationship relative to each other to secure each of the top panel members 61 on the intermediate panel. Surface portions of the side members 60, the members 62, and the top panel members 61 define three parallel spaced open-ended and upwardly opening slots 63 extending in parallel spaced relation through the pallet to receive the fork members 59 at their upper position relative to the pallet, FIGURE 10, when using the fork lift truck to load cargo on and unload it from the pallet.

The top edge surfaces 60b of the side members 60 and the top surfaces 61a of the upper panel members 61 lie in a common plane for supporting cargo, such as the filled bags 40, on the pallet.

The pallet 50 is loaded, unloaded, and handled in the same manner as the pallet 20 as above described. The pallet 50 is employed with lift trucks having triple pronged fork members which may in some instances be used with heavier loads than served by the dual fork member trucks. The free fork prongs 59 are inserted into the slots 55 with the top surfaces of the prongs engaging the lower surface portions of the intermediate panel 52 for supporting the pallet either loaded or empty from the fork lift truck. Cargo is loaded on and unloaded from the pallet by manipulating the prongs 59 at the upper position shown in FIGURE 10 within the slots 63. The procedures of handling the cargo are identical to those described above in connection with the pallet 20.

A still further modified form of cargo pallet 100 embodying the invention is illustrated in FIGURE 12 which represents a reversible pallet which rests on either side while cargo is supportable on the other side and is removable by a fork lift truck in the same manner as described in connection with the pallets 20 and 50. The components of the pallet 100 including its intermediate panel and the structure on each side face of the intermediate panel are identical to the intermediate panel and upper structure of the pallet 20. Such components are denoted by the same reference numerals used in FIGURES 1–3 preceded by the numeral 1. Thus, the pallet 100 has supporting surfaces 132a and 134a with fork member receiving slots 135 in which the fork members are received for moving cargo from the pallet and for supporting the pallet. When the cargo is on the upper surfaces 132a and 134a the pallet rests on the lower surfaces 132a and 134a. Similarly, the lower slots receive the fork members for moving the pallet while the upper slots are used for cargo removal. Since identical structure is on each side of the intermediate panel, the pallet is reversible. It will be clear that the pallet 100 may impose greater bending stresses on its intermediate panel 122 since it does not have an additional continuous lower panel such as the panel 25 of FIGURE 3 to enhance the rigidity and strength of the pallet. Thus, in the pallet 100 the intermediate panel 122 is preferably so dimensioned or of a material that its resistance to bending stresses is greater than the intermediate panel 22 of the pallet 20.

It will be clear that a pallet embodying the invention similar to the pallet 50 of FIGURE 10 may also be constructed for reversible use by providing structure below the intermediate panel 52 identical to that shown in FIGURE 10 above the panel. Thus, such a pallet will have an intermediate panel supporting identical structure along its opposite faces providing cargo supporting surfaces and triple spaced fork lift member receiving slots so cargo may be supported along either face with the pallet resting along the opposite face on a surface such as the floor. The fork lift members are insertable into and removable from either set of slots for removing cargo by lifting the fork members. Also either set of slots receive the fork members for supporting the pallet from the fork members as previously discussed.

Certain obvious modifications may be made in both the pallets 20 and 50 while retaining the functions and configurations illustrated and described above. For example, in both pallets 20 and 50 the pairs of side members 34a and 60, respectively, may be replaced by one piece or unitary members. Also, if the pallets are formed of a material such as metal, portions of the pallet structure such as the top deck member 32 and the longitudinal members 33 connected thereto in the pallet 20 may be an integral channel member with its lower edge portions being suitably secured as by welding to the intermediate panel member 22. Similarly, in the pallet 50 the channel shaped portions of the structure formed by each of the top deck members 61 and their adjoining longitudinal members 62 may be replaced by unitary channel members.

It will now be seen that new and improved apparatus for handling and storing cargo has been described and illustrated.

It will also be seen that new and improved pallets for use with a fork lift truck have been described and illustrated.

It will be further seen that cargo is placed on and removed from the pallets without affecting the position of or engaging the pallets during either loading or unloading.

It will be further seen that the pallets have longitudinally extending open-ended lower slots for receiving fork members when the pallet is supported by a fork lift truck for movement between locations and during loading.

It will also be seen that a pallet embodying the invention has longitudinal open-ended upwardly opening slots for receiving fork members of a fork lift truck while placing cargo on and removing it from the pallet.

It will additionally be seen that pallets embodying the invention have lower and intermediate panel members interconnected to define therebetween longitudinal fork member receiving slots for supporting the pallets from a lift truck while handling them and upper deck member means for supporting cargo on the pallets and defining upwardly opening open-ended slots for receiving fork members during the loading and unloading of cargo.

It will be further seen that one specific form of pallet has upper and lower slots for use with a fork lift truck having dual fork members.

It will also be seen that another form of pallet has upper and lower slots for use with a fork lift truck having a triple pronged fork member.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A cargo pallet for supporting and storing cargo and adapted to be handled by a fork lift truck comprising: a lower panel; an intermediate panel positioned in substantially parallel spaced relationship from said lower panel member; longitudinal runner members secured between said lower and intermediate panel members in substantially parallel spaced relationship defining with portions of said panel members a plurality of open-ended lower slots for receiving fork members of a fork lift truck for supporting said pallet on said fork members with lower surface portions of said intermediate panel member engaging said fork members; top panel means secured in parallel spaced relation with said intermediate panel member providing upwardly facing cargo supporting surface portions; longitudinally extending side members secured on said intermediate panel member in spaced substantially parallel relationship with said top panel means providing upwardly facing edge surface portions in substantially the same plane as said top surface of said top panel means for supporting cargo; and said top panel means and said side members being spaced to define upwardly opening open-ended substantially parallel upper spaced recesses for receiving fork members while positioning cargo on and removing cargo from said cargo supporting surface portions of said pallet.

2. A cargo pallet as defined in claim 1 wherein said lower and intermediate panel members are interconnected by three spaced longitudinal runner members defining a pair of parallel lower slots for receiving dual spaced fork members at a lower pallet supporting position and said top deck means comprises a single top deck member spaced between said longitudinal side members defining a pair of said upwardly opening upper recesses for receiving said dual fork members at an upper cargo loading and unloading position.

3. A cargo pallet as defined in claim 1 wherein said lower and intermediate panel members are interconnected by spaced substantially parallel runners defining three substantially parallel spaced lower open-ended slots for receiving triple spaced fork members at a lower pallet supporting position and said top deck means comprising a pair of substantially parallel spaced top deck members substantially evenly spaced between said longitudinal side members, said side members and said top deck members defining three spaced substantially parallel upwardly opening open-ended upper slots for receiving said triple fork members at an upper cargo loading and unloading position.

4. A pallet adapted to be supported and manipulated by a fork lift truck for handling and storing cargo comprising: a central transverse support member engageable on either side face by a fork member for lifting and supporting said pallet; substantially identical means secured on opposite side faces of said transverse support member providing support surfaces in substantially parallel spaced relation from said opposite faces of said transverse support member and having opening means therein to receive said fork member whereby said fork member is insertable into and removable from said opening means longitudinally relative to said support member faces and toward and away from said support member faces between said supporting surfaces on opposite sides of said support member whereby when said pallet rests on said supporting surfaces on one side of said transverse support member and cargo is supported on said supporting surfaces on the other side of said support member said fork member is insertable into said opening means beneath said cargo and movable away from said support member for lifting said cargo from said support surfaces beneath said cargo, said pallet being reversible whereby cargo is supportable on said support surfaces on either side of said transverse support member while said pallet rests on said support surfaces on the other side of said transverse support member.

5. A pallet as defined in claim 4 wherein said opening means in said supporting surfaces comprises a pair of parallel spaced longitudinal recesses extending along said support member opening away from said central support member.

6. A pallet as defined in claim 4 wherein said opening means on each side of said central transverse support member comprises three parallel spaced longitudinal slots opening away from said central transverse support member.

7. A pallet, adapted to be supported and manipulated by a fork member of a fork lift device for handling and storing cargo and permitting removal of cargo from said pallet by said fork member, comprising: a central transverse support member having opposed surfaces engageable on either side by said fork member for supporting and lifting said pallet; first cargo support means disposed to project from one surface of said central transverse support member; second cargo support means disposed to project from the other surface of said central transverse support member; said support means on the upwardly facing side of said central transverse support member providing supporting surfaces for receiving and supporting a cargo above said pallet; said support means on the downwardly facing side of said central transverse support member providing surfaces for supporting said pallet on a surface below said pallet; each of said cargo support means having spaced openings for receiving said fork member of said fork lift device; said openings in said cargo support means above said central transverse support member receiving said fork member while loading and unloading cargo on said pallet, and said openings in said cargo support means below said transverse central support member receiving said fork member below said transverse support member for supporting and transporting said pallet; said pallet being reversible whereby the one of said cargo support means facing upwardly serves a cargo supporting function when facing upwardly and the one of said cargo support means facing downwardly serves a pallet supporting function when facing downwardly.

References Cited

UNITED STATES PATENTS

| | | | |
|---|---|---|---|
| 2,412,184 | 12/1946 | Ulinski | 108—52 |
| 2,509,682 | 4/1950 | Golrick | 108—52 |
| 2,662,711 | 12/1953 | Lapham | 108—52 |
| 3,294,041 | 12/1966 | Lessheim | 108—58 |
| 3,229,836 | 1/1966 | Koenig | 108—52 XR |

FOREIGN PATENTS 763,420  12/1956  Great Britain.

BOBBY R. GAY, *Primary Examiner.*

G. O. FINCH, *Assistant Examiner.*